(12) United States Patent
Lyu et al.

(10) Patent No.: US 11,018,802 B2
(45) Date of Patent: May 25, 2021

(54) CHANNEL QUALITY INDICATOR FEEDBACK METHOD AND DEVICE

(71) Applicant: HUAWEI TECHNOLOGIES CO., LTD., Shenzhen (CN)

(72) Inventors: Yongxia Lyu, Ottawa (CA); Ruixiang Ma, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 22 days.

(21) Appl. No.: 16/575,530

(22) Filed: Sep. 19, 2019

(65) Prior Publication Data

US 2020/0014488 A1 Jan. 9, 2020

Related U.S. Application Data

(63) Continuation of application No. PCT/CN2018/079512, filed on Mar. 20, 2018.

(30) Foreign Application Priority Data

Mar. 24, 2017 (CN) .............................. 201710184957

(51) Int. Cl.
*H04L 1/00* (2006.01)
*H04L 1/16* (2006.01)

(52) U.S. Cl.
CPC .......... *H04L 1/0026* (2013.01); *H04L 1/0003* (2013.01); *H04L 1/0009* (2013.01); *H04L 1/1671* (2013.01)

(58) Field of Classification Search
None
See application file for complete search history.

(56) References Cited

U.S. PATENT DOCUMENTS

| | | | |
|---|---|---|---|
| 9,191,162 B2* | 11/2015 | Baldemair | ............ H04L 1/1671 |
| 2005/0053038 A1 | 3/2005 | Kimura | |
| 2009/0141673 A1 | 6/2009 | Hwang et al. | |
| 2012/0039200 A1* | 2/2012 | Lee | ............ H04W 52/0216 370/252 |
| 2012/0207054 A1 | 8/2012 | Okubo et al. | |
| 2013/0100911 A1* | 4/2013 | Lv | ............ H04L 1/0073 370/329 |
| 2015/0358982 A1 | 12/2015 | Jeon et al. | |

(Continued)

FOREIGN PATENT DOCUMENTS

| | | |
|---|---|---|
| CN | 101478786 A | 7/2009 |
| CN | 102281133 A | 12/2011 |

(Continued)

*Primary Examiner* — Hong S Cho (74) *Attorney, Agent, or Firm* — Maier & Maier, PLLC (57) ABSTRACT

A channel quality indicator feedback method and device. The method includes: determining, by a terminal device, a response message of data and a channel state, where the response message includes an acknowledgement message and/or a negative acknowledgement message; determining, by the terminal device, first channel state information based on the response message of the data and the channel state; and sending, by the terminal device, the response message and the first channel state information to the network side device. According to the method and apparatus provided, reliability of downlink data from a base station can be improved.

20 Claims, 6 Drawing Sheets

(56) References Cited

U.S. PATENT DOCUMENTS

2017/0164360 A1\* 6/2017 Kim .................... H04L 5/0007
2017/0359827 A1 12/2017 Kim et al.
2018/0084543 A1 3/2018 Lv et al.

FOREIGN PATENT DOCUMENTS

CN 103475455 A 12/2013
CN 104038308 A 9/2014
WO 2016/089044 A1 6/2016

\* cited by examiner

CHANNEL QUALITY INDICATOR FEEDBACK METHOD AND DEVICE

CROSS-REFERENCE TO RELATED APPLICATIONS

This application is continuation application of International Application No. PCT/CN2018/079512, filed on Mar. 20, 2018, which claims priority to Chinese Patent Application No. 201710184957.X, filed on Mar. 24, 2017, the disclosures of the aforementioned applications are hereby incorporated by reference in their entireties.

FIELD

This application relates to the field of wireless communications technologies, and in particular, to a channel quality indicator feedback method and device.

BACKGROUND

In a long term evolution (LTE) system, when sending data to a terminal, a base station first performs modulation and coding on to-be-sent data. There are a number of levels of modulation and coding schemes (MCS) on a base station side, and MCSs of different levels are applicable to different channel states. For example, if current channel quality is relatively good, the base station side may select a high-level MCS with a high transmission bit rate and high coding efficiency but low reliability. However, when channel quality is relatively poor, the base station side may select a low-level MCS with a relatively low transmission bit rate and low coding efficiency but high reliability. Then, modulated and encoded data is sent to a terminal side. After receiving the modulated and encoded data, the terminal side first determines whether the data is correctly received. If the data is correctly received, the terminal side feeds back an acknowledgement (ACK) message to the base station side. If the data is not correctly received, the terminal side feeds back a negative acknowledgement (NACK) message to the base station side.

After receiving the NACK message sent by the terminal, the base station side re-sends the data, and a process for re-sending the data is as follows: the base station first determines an MCS level used when the data is sent last time, then performs modulation and coding on the data again by using the MCS level of last time, and sends modulated and encoded data to the terminal side. In practical application, after performing modulation and coding on to-be-sent data by using an MCS of a level for the first time, a base station sends modulated and encoded data to a terminal side, but the terminal side does not correctly receive the data, indicating that channel quality at this time does not match the MCS level. Therefore, when the data is retransmitted, if an MCS of a level the same as that of last time is used to perform coding and modulation on the retransmitted data, reliability of the retransmitted data cannot be ensured, either. In other words, if the MCS of the level the same as that for data transmission of last time is used to perform coding and modulation on the retransmitted data, it cannot be ensured that the terminal side can correctly receive the retransmitted data. In particular, a future 5G communications system is dedicated to providing higher service performance, and data transmitted each time, especially retransmitted data, is required to be as correct as possible. Therefore, improvement of reliability of downlink data of a base station is a technical problem that needs to be urgently resolved at present.

SUMMARY

This application provides a channel quality indicator feedback method and device, to improve reliability of downlink data from a base station.

According to a first aspect, a channel quality indicator feedback method is provided, including: determining, by a terminal device, a response message of data and a channel state, where the response message includes an acknowledgement message and/or a negative acknowledgement message; determining, by the terminal device, first channel state information based on the response message of the data and the channel state; and sending, by the terminal device, the response message and the first channel state information to the network side device.

With reference to the first aspect, in a first possible implementation, the response message includes only the negative acknowledgement message (NACK). The determining, by a terminal device, of a response message of data and channel state information includes: determining, by the terminal device when the response message of the data is the NACK message, a first channel state of a channel corresponding to the data. The determining, by the terminal device, first channel state information based on the response message of the data and the channel state includes: determining, by the terminal device, the first channel state information based on the NACK message of the data and the first channel state.

With reference to the first possible implementation, in a second possible implementation, the response message includes the acknowledgement message (ACK) and the NACK message. The determining, by a terminal device, of a response message of data and channel state information includes: determining, by the terminal device when the response message of the data is the NACK message, a second channel state of a channel corresponding to the data; and determining, by the terminal device when the response message of the data is the ACK message, a third channel state of the channel corresponding to the data.

The determining, by the terminal device, of first channel state information based on the response message of the data and the channel state information includes: determining, by the terminal device, the first channel state information based on the NACK message and the second channel state; or determining, by the terminal device, the first channel state information based on the ACK message and the third channel state.

With reference to the first aspect, the first possible implementation or the second possible implementation, in a third possible implementation, the response message indicates a direction for adjusting a modulation and coding scheme, and the direction for adjusting the modulation and coding scheme is improving a level of the modulation and coding scheme or reducing the level of the modulation and coding scheme. The first channel state information indicates an offset of adjusting the level of the modulation and coding scheme, and the modulation and coding scheme is used to perform modulation and coding on the data.

With reference to the third possible implementation, in a fourth possible implementation, the ACK message indicates that the direction for adjusting the modulation and coding scheme by the network side device is improving the level of the modulation and coding scheme, and the NACK message indicates that the direction for adjusting the modulation and coding scheme by the network side device is reducing the level of the modulation and coding scheme.

With reference to the first aspect or any one of the first to the third possible implementations, in the fifth possible implementation, the sending, by the terminal device, of the response message and the first channel state information to the network side device includes: receiving, by the terminal device, a downlink scheduling instruction sent by the network side device, where the downlink scheduling instruction is used to indicate a timing relationship among the data, the response message, and the first channel state information; and sending, by the terminal device, the response message and the first channel state information to the network side device based on the timing relationship.

With reference to the first aspect or any one of the first to the fifth possible implementations, in a sixth possible implementation, channel coding is separately performed on the response message and the first channel state information.

With reference to the sixth possible implementation, in a seventh possible implementation, the response message is encoded in a first coding scheme, and the first channel state information is encoded in a second coding scheme.

According to a second aspect, a channel quality indicator feedback method is provided, including: receiving, by a network side device, a response message and first channel state information that are sent by a terminal, where the response message includes an ACK message and/or a NACK message; and determining, by the network side device, a channel state based on the response message and the first channel state information.

With reference to the second aspect, in a first possible implementation, the response message is the NACK message. The receiving, by a network side device, a response message and first channel state information that are sent by a terminal device includes: receiving, by the network side device, the NACK message and the first channel state information that are sent by the terminal device, where the NACK message is a response message of the terminal device to data sent by the network side device, and the first channel state information is generated by the terminal device based on the negative acknowledgement message and a first channel state. Adjusting, by the network side device based on the response message and the first channel state information, a modulation and coding scheme for sending downlink data includes: adjusting, by the network side device based on the NACK message and the first channel state information, the modulation and coding scheme for sending the downlink data.

With reference to the second aspect, in a second possible implementation, the response message includes the acknowledgement message and the negative acknowledgement message. The receiving, by a network side device, of a response message and first channel state information that are sent by a terminal device includes: receiving, by the network side device, the NACK message and the first channel state information that are sent by the terminal device, where the NACK message is a response message of the terminal device to data sent by the network side device, and the first channel state information is generated by the terminal device based on the NACK message and a second channel state; or receiving, by the terminal device, the acknowledgement message and the first channel state information that are sent by the terminal device, where the ACK message is a response message of the terminal device to data sent by the network side device, and the first channel state information is generated by the terminal device based on the NACK message and a third channel state. Adjusting, by the network side device based on the response message and the first channel state information, a modulation and coding scheme for sending downlink data includes: adjusting, by the network side device based on the NACK message and the first channel state information, the modulation and coding scheme for sending the downlink data; or adjusting, by the network side device based on the acknowledgement message and the first channel state information, the modulation and coding scheme for sending the downlink data.

With reference to the second aspect, or any one of the first possible implementation to the second possible implementation, in a third possible implementation, the response message indicates a direction for adjusting a modulation and coding scheme, and the direction for adjusting the modulation and coding scheme is improving a level of the modulation and coding scheme or reducing the level of the modulation and coding scheme. The first channel state information indicates an offset of adjusting the level of the modulation and coding scheme.

With reference to the third possible implementation, in a fourth possible implementation, the ACK message indicates that the direction for adjusting the modulation and coding scheme by the network side device is improving the level of the modulation and coding scheme, and the NACK message indicates that the direction for adjusting the modulation and coding scheme by the network side device is reducing the level of the modulation and coding scheme.

With reference to the second aspect or any one of the first to the fourth possible implementations, in a fifth possible implementation, the receiving, by a network side device, of a response message and first channel state information that are sent by a terminal device includes: sending, by the network side device, a downlink scheduling instruction, where the downlink scheduling instruction is used to indicate a timing relationship among the data, the response message, and the first channel state information; and receiving, by the network side device based on the timing relationship, the response message and the first channel state information that are sent by the terminal device.

With reference to the second aspect or any one of the first to the fifth possible implementations of the second aspect, in a sixth possible implementation, channel coding is separately performed on the response message and the first channel state information.

With reference to the sixth possible implementation, in a seventh possible implementation, the response message is encoded in a first coding scheme, and the first channel state information is encoded in a second coding scheme.

According to a third aspect, a channel quality indicator feedback device is provided, including a processor and a memory.

The memory is configured to store an instruction.

The processor is configured to execute the instruction stored in the memory, and when the processor executes the instruction stored in the memory, the processor is configured to: determine a response message of data and a channel state, where the response message includes an acknowledgement message and/or a negative acknowledgement message; determine first channel state information based on the response message of the data and the channel state; and send the response message and the first channel state information to the network side device.

With reference to the third aspect, in a first possible implementation, the response message includes only the NACK message. When determining the response message of the data and the channel state information, the processor is configured to: when the response message of the data is the NACK message, determine a first channel state of a channel corresponding to the data. When determining the first channel state information based on the response message of the data and the channel state, the processor is configured to determine the first channel state information based on the NACK message of the data and the first channel state.

With reference to the third aspect, in a second possible implementation, the response message includes the ACK message and the NACK message. When determining the response message of the data and the channel state information, the processor is configured to: when the response message of the data is the NACK message, determine a second channel state of a channel corresponding to the data; and when the response message of the data is the ACK message, determine a third channel state of the channel corresponding to the data. When determining the first channel state information based on the response message of the data and the channel state information, the processor is configured to: determine the first channel state information based on the NACK message and the second channel state; or determine the first channel state information based on the ACK message and the third channel state.

With reference to the third aspect, the first possible implementation, or the second possible implementation, in a third possible implementation, the response message indicates a direction for adjusting a modulation and coding scheme, and the direction for adjusting the modulation and coding scheme is improving a level of the modulation and coding scheme or reducing the level of the modulation and coding scheme. The first channel state information indicates an offset of adjusting the level of the modulation and coding scheme, and the modulation and coding scheme is used to perform modulation and coding on the data.

With reference to the third possible implementation, in a fourth possible implementation, the ACK message indicates that the direction for adjusting the modulation and coding scheme by the network side device is improving the level of the modulation and coding scheme, and the NACK message indicates that the direction for adjusting the modulation and coding scheme by the network side device is reducing the level of the modulation and coding scheme.

With reference to the third aspect or any one of the first to the fourth possible implementations, in a fifth possible implementation, when sending the response message and the first channel state information to the network side device, the processor is configured to: receive a downlink scheduling instruction sent by the network side device, where the downlink scheduling instruction is used to indicate a timing relationship among the data, the response message, and the first channel state information; and send the response message and the first channel state information to the network side device based on the timing relationship.

With reference to the third aspect or any one of the first to the fifth possible implementations, in a sixth possible implementation, channel coding is separately performed on the response message and the first channel state information.

With reference to the sixth possible implementation, in a seventh possible implementation, the response message is encoded in a first coding scheme, and the first channel state information is encoded in a second coding scheme.

According to a fourth aspect, a channel quality indicator feedback device is provided, including a processor and a memory. The memory is configured to store an instruction. The processor is configured to execute the instruction stored in the memory, and when the processor executes the instruction stored in the memory, the device is configured to: receive a response message and first channel state information that are sent by a terminal, where the response message includes an acknowledgement message and/or a negative acknowledgement message; and determine a channel state based on the response message and the first channel state information.

With reference to the fourth aspect, in a first possible implementation, the response message is the NACK message. When receiving the response message and the first channel state information that are sent by the terminal device, the processor is configured to receive the NACK message and the first channel state information that are sent by the terminal device, where the NACK message is a response message of the terminal device to data sent by the network side device, and the first channel state information is generated by the terminal device based on the NACK message and a first channel state. When adjusting, based on the response message and the first channel state information, a modulation and coding scheme for sending downlink data, the processor is configured to adjust, based on the NACK message and the first channel state information, the modulation and coding scheme for sending the downlink data.

With reference to the fourth aspect, in a second possible implementation, the response message includes the ACK message and the NACK message. When receiving the response message and the channel state information that are sent by the terminal device, the processor is configured to receive the NACK message and the first channel state information that are sent by the terminal device, where the NACK message is a response message of the terminal device to data sent by the network side device, and the first channel state information is generated by the terminal device based on the NACK message and a second channel state; or the processor receives the ACK message and the first channel state information that are sent by the terminal device, where the ACK message is a response message of the terminal device to data sent by the network side device, and the first channel state information is generated by the terminal device based on the NACK message and a third channel state. When adjusting, based on the response message and the channel state information, a modulation and coding scheme for sending downlink data, the processor is configured to: adjust, based on the NACK message and the first channel state information, the modulation and coding scheme for sending the downlink data; or adjust, based on the ACK message and the first channel state information, the modulation and coding scheme for sending the downlink data.

With reference to the fourth aspect, the first possible implementation, or the second possible implementation, in a third possible implementation, the response message indicates a direction for adjusting a modulation and coding scheme, and the direction for adjusting the modulation and coding scheme is improving a level of the modulation and coding scheme or reducing the level of the modulation and coding scheme. The first channel state information indicates an offset of adjusting the level of the modulation and coding scheme.

With reference to the third possible implementation, in a fourth possible implementation, the acknowledgement message indicates that the direction for adjusting the modulation and coding scheme by the network side device is improving the level of the modulation and coding scheme, and the NACK message indicates that the direction for adjusting the modulation and coding scheme by the network side device is reducing the level of the modulation and coding scheme.

With reference to the fourth aspect or any one of the first to the fourth possible implementations, in a fifth possible implementation, when receiving the response message and the first channel state information that are sent by the terminal device, the processor is configured to: send a downlink scheduling instruction, where the downlink scheduling instruction is used to indicate a timing relationship among the data, the response message, and the first channel state information; and receive, based on the timing relationship, the response message and the first channel state information that are sent by the terminal device.

With reference to the fourth aspect or any one of the first to the fifth possible implementations, in a sixth possible implementation, channel coding is separately performed on the response message and the first channel state information.

With reference to the sixth possible implementation, in a seventh possible implementation, the response message is encoded in a first coding scheme, and the first channel state information is encoded in a second coding scheme.

It can be understood that the terminal device sends the response message and the channel state information to the network side device, and the network side device may determine, based on the response message and the channel state information, an MCS that matches a current communication environment to encode the downlink data, so as to improve correctness of transmitting data between the network side device and the terminal device.

DETAILED DESCRIPTION OF EMBODIMENTS

For ease of understanding, descriptions of related concepts in this application are provided as examples for reference below:

A wireless communications network is a network providing a wireless communication function. The wireless communications network may use different communications technologies, for example, code division multiple access (CDMA), wideband code division multiple access (WCDMA), time division multiple access (TDMA), frequency division multiple access (FDMA), orthogonal frequency division multiple access (OFDMA), single carrier frequency division multiple access (single Carrier FDMA, SC-FDMA), and carrier sense multiple access with collision avoidance. Based on factors such as capacities, rates, and delays of different networks, networks may be classified into a 2G (generation) network, a 3G network, a 4G network, and a future evolved network such as a 5G network. A typical 2G network includes a global system for mobile communications (GSM) network or a general packet radio service (GPRS) network. A typical 3G network includes a universal mobile telecommunications system (UMTS) network. A typical 4G network includes a long term evolution (LTE) network. The UMTS network sometimes may also be referred to as a universal terrestrial radio access network (UTRAN), and the LTE network sometimes may also be referred to as an evolved universal terrestrial radio access network (e E-UTRAN). Based on different resource allocation manners, networks may be classified into a cellular communications network and a wireless local area network (WLAN). The cellular communications network is based on scheduling, and the WLAN is based on contention. All the foregoing 2G, 3G, and 4G networks are cellular communications networks.

User equipment is a terminal device, and may be a movable terminal device or an unmovable terminal device. The device is mainly configured to receive or send service data. The user equipment may be distributed in a network. In different networks, the user equipment has different names, such as a terminal, a mobile station, a subscriber unit, a station, a cellular phone, a personal digital assistant, a wireless modem, a wireless communications device, a handheld device, a laptop computer, a cordless telephone set, a wireless local loop station, and an in-vehicle device. The user equipment may communicate with one or more core networks through a radio access network (RAN) (an access part of a wireless communications network), for example, exchanging voice and/or data with the radio access network.

A base station device may also be referred to as a base station, and is an apparatus that is deployed in a RAN to provide a wireless communication function. For example, in a 2G network, devices providing a base station function include a base transceiver station (BTS) and a base station controller (BSC). In a 3G network, devices providing a base station function include a NodeB and a radio network controller (RNC). In a 4G network, a device providing a base station function includes an evolved NodeB (evolved NodeB, eNB). In a WLAN, a device providing a base station function is an access point. In a future 5G network such as a new radio (NR) network or an LTE+ network, a device providing a base station function includes a next generation NodeB (gNB), a transmission and reception point (TRP), or a transmission point (TP). The TRP or the TP may not include a baseband part but only include a radio frequency part, or may include a baseband part and a radio frequency part.

A response message is a response message of user equipment to downlink data sent by a base station, and the response message is classified into an acknowledgement (ACK) message and a negative acknowledgement (NACK) message. When correctly receiving the downlink data, the user equipment feeds back the ACK message to the base station; otherwise, the user equipment feeds back the NACK message.

A modulation and coding scheme (MCS) is used to number different modulation and coding schemes, so that a system invokes different communication policies. The MCS is classified into different levels. A higher MCS level indicates higher modulation and coding efficiency, but lower reliability.

A channel quality indicator (CQI) is used to indicate quality of a current channel, and corresponds to a signal-to-noise ratio of the channel.

A network side device is a device located on a network side in a wireless communications network, and may be an access network element, such as a base station or a controller (if any), or may be a core network element, or may be another network element.

NR is a new-generation radio access network technology, and may be applied to a future evolved network, such as a 5G network.

Figure 1:
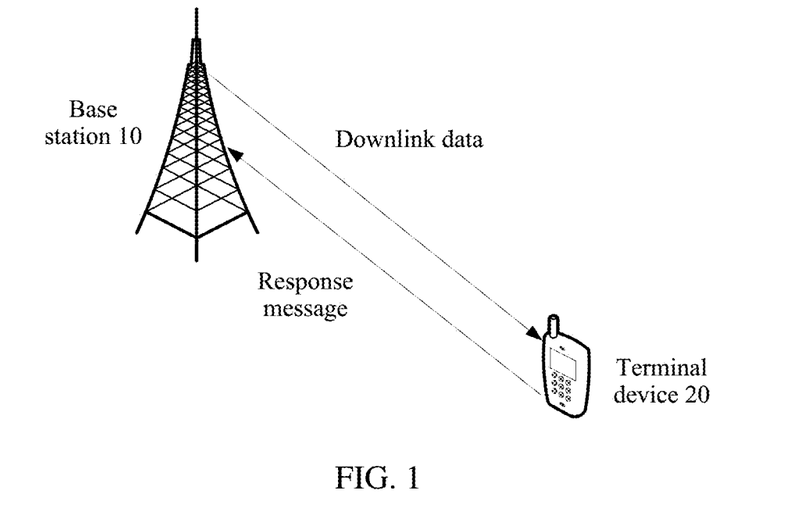
FIG. 1 is a schematic diagram of a wireless communications system according to this application.

The following describes the technical solutions of this application with reference to the accompanying drawings:

FIG. 1 shows a possible wireless communications network according to an embodiment. As shown in FIG. 1, a base station 10 may send downlink data to terminal device 20. After receiving the downlink data, the terminal device 20 determines, based on check information of the downlink data, whether the downlink data is correctly received, and feeds back a response message to the base station 10. When correctly receiving the downlink data, the terminal device 20 feeds back an ACK message to the base station 10. However, when not correctly receiving the downlink data, the terminal device 20 feeds back a NACK message to the base station.

NR is dedicated to providing higher service performance, and data transmitted each time, for example retransmitted data, should be as correct as possible.

Based on this, this application provides a channel quality indicator feedback method, and the method includes a main principle as follows: user equipment reports a response message together with a CQI to a base station, so that the base station selects a matching MCS based on the CQI to perform modulation and coding on downlink data, so as to improve correctness of receiving data by the UE.

In some scenarios in the embodiments of this application, a 4G network scenario in a wireless communications network is used as an example for description. It should be noted that the solutions in the embodiments may be further applied to another wireless communications network, and a corresponding name may be replaced with a name of a corresponding function in the another wireless communications network.

It should be noted that the methods or apparatuses in the embodiments may be applied between a network side device and user equipment, between network side devices (for example, between a macro base station and a micro base station), or between elements of user equipment (for example, in a D2D scenario). In all the embodiments, communication between a network side device and user equipment is used as an example for description.

Figure 2:
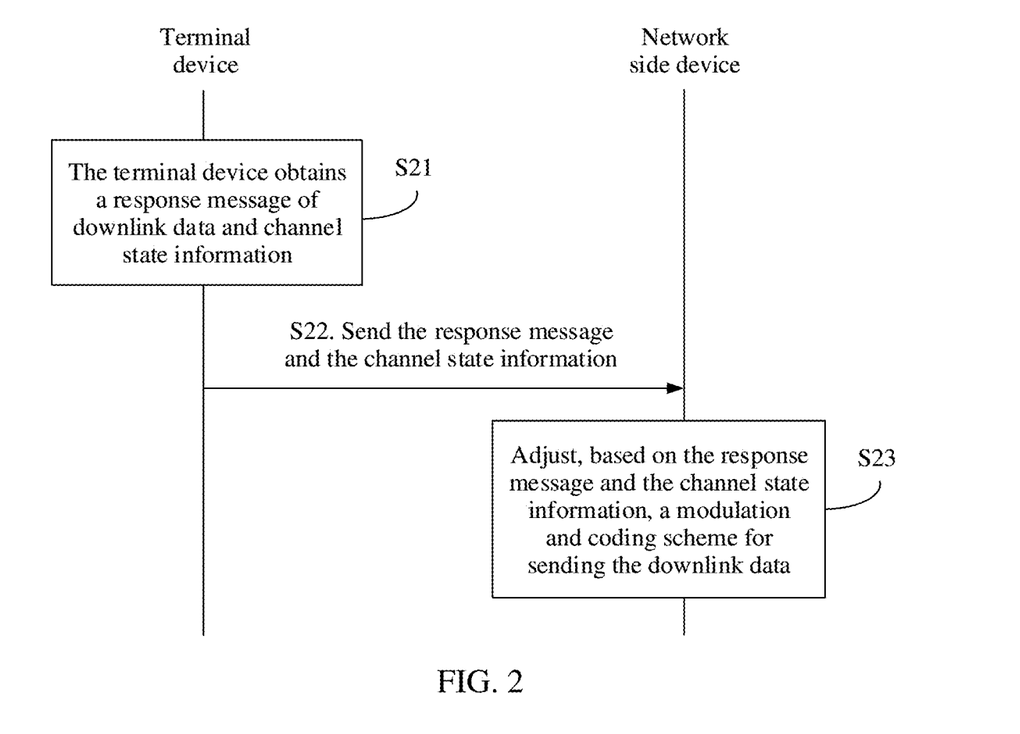
FIG. 2 is a flowchart of a channel quality indicator feedback method according to this application.

FIG. 2 is a process of a channel quality indicator feedback method according to an embodiment. As shown in FIG. 2, the method includes the following steps.

Step S21: a terminal device obtains a response message of downlink data and channel state information, where the response message includes an ACK message and/or a NACK message, and the channel state information and the response message indicate a modulation and coding scheme for a network device to send the downlink data.

For example, the response message indicates a direction for adjusting the modulation and coding scheme by the network side device, and the direction for adjusting the modulation and coding scheme is improving a level of the modulation and coding scheme or reducing the level of the modulation and coding scheme. The channel state information indicates an offset of adjusting the level of the modulation and coding scheme by the network side device, and the modulation and coding scheme is used by the network side device to perform modulation and coding on the downlink data. In addition, channel coding may be separately performed on the response message and the channel state information. The response message is encoded in a first coding scheme, and the channel state information is encoded in a second coding scheme.

Step S22, the terminal device sends the response message and the channel state information to the network side device.

Step S23, the network side device adjusts, based on the response message and the channel state information, the modulation and coding scheme for sending the downlink data.

It can be understood that the terminal device sends the response message and the channel state information to the network side device, and the network side device may determine, based on the response message and the channel state information, an MCS that matches a current communication environment to encode the downlink data, so as to improve correctness of transmitting data between the network side device and the terminal device.

Figure 3:
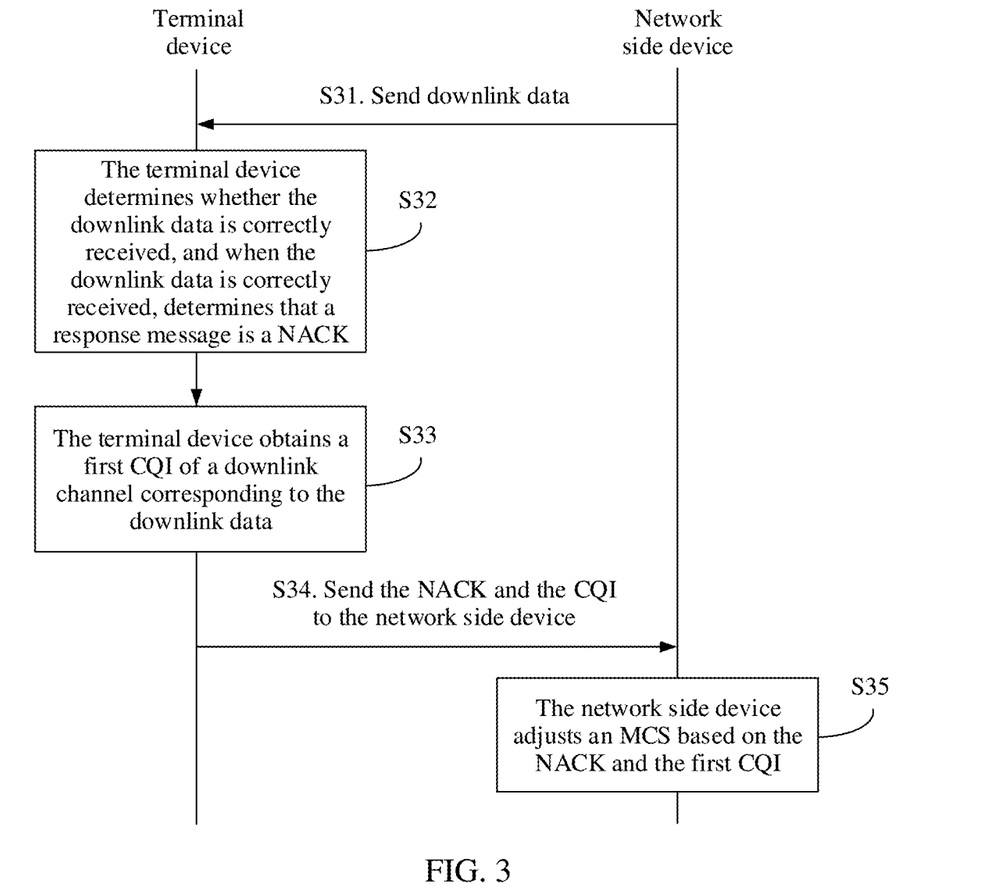
FIG. 3 is a flowchart of a channel quality indicator feedback method according to this application.

In an implementation, a terminal device reports a CQI only when a response message is a NACK. As shown in FIG. 3, the implementation is as follows:

Step S31, a network side device sends downlink data.

Step S32, the terminal device determines whether the downlink data is correctly received, and when the downlink data is correctly received, determines that a response message is a NACK.

Step S33, the terminal device obtains a first CQI of a downlink channel corresponding to the downlink data.

For example, the terminal device may determine a CQI of a current downlink channel based on a demodulation pilot signal carried in the downlink data, and the demodulation pilot signal is used by the terminal device to demodulate the downlink data; and/or the terminal device determines a CQI of a current downlink channel based on a measurement pilot signal corresponding to the downlink data, and the measurement pilot signal is used to determine a channel state of the current downlink channel.

Step S34, the terminal device sends the NACK and the CQI to the network side device.

Further, the terminal device may send the CQI to the network side device through a first physical uplink control channel and send the NACK message to the network side device through a second physical uplink control channel. The first physical uplink control channel and the second physical uplink control channel may be multiplexed in a time division manner, and the second physical uplink control information may be sent.

Alternatively, the terminal device may send the CQI and the NACK message to the network side device through a third physical uplink control channel. The CQI is mapped to the third physical uplink control channel in a first coding scheme, and the NACK message is mapped to the third physical uplink control channel in a second coding scheme.

Still further, the first physical uplink control channel, the second physical uplink control channel, or the third physical uplink control channel is a physical uplink control channel with a channel capacity less than a preset value. In practical application, there are large-capacity physical uplink control channels and small-capacity physical uplink control channels in an entire wireless communications network. Because data volumes of both the NACK and the CQI are relatively small, in this application, the small-capacity physical uplink control channels may be used to save system resources.

For example, a frequency domain resource and a code domain resource of the first physical uplink control channel that are occupied by reporting the CQI may be configured by a base station by using higher-layer signaling or physical layer information. Configuring the signaling is specific to a user.

Step S35, the network side device adjusts an MCS based on the NACK and the first CQI, where the MCS is used to perform modulation and coding on the downlink data.

In this application, the NACK may indicate a direction for adjusting the MCS, for example, reducing a level of the MCS, and the CQI may indicate an offset of adjusting a level of the MCS. For example, when the CQI is 0, the level of the MCS is adjusted by one level, and when the CQI is 1, the level of the MCS is adjusted by two levels.

Figure 4:
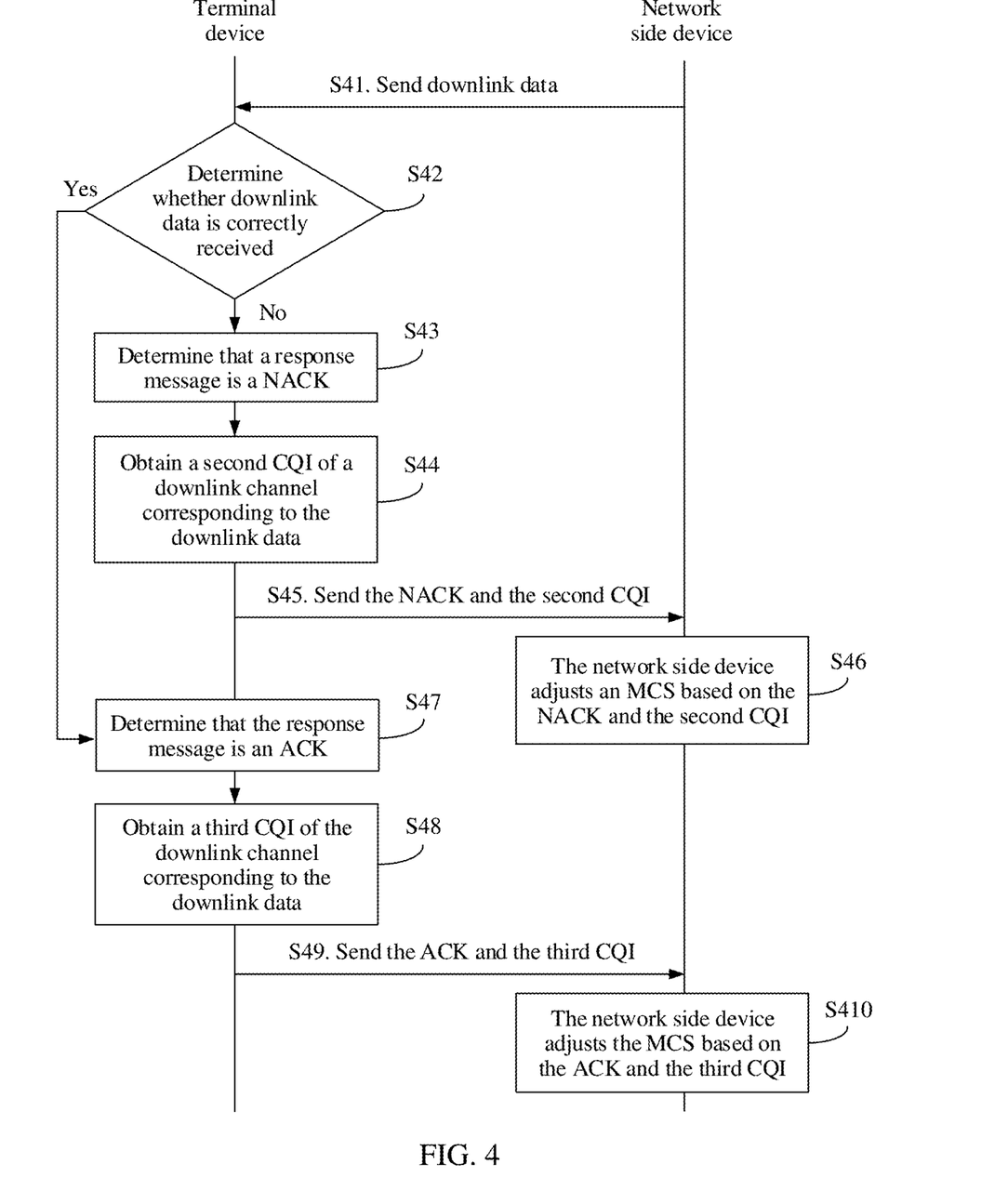
FIG. 4 is a flowchart of a channel quality indicator feedback method according to this application.

In an implementation, a terminal device reports a CQI when a response message is a NACK or an ACK. As shown in FIG. 4, the implementation is as follows:

Step S41, a network side device sends downlink data.

Step S42, the terminal device determines whether the downlink data is correctly received; and if no, performs S43, and if yes, performs S47.

Step S43, the terminal device determines that a response message is a NACK.

Step S44, the terminal device obtains a second CQI of a downlink channel corresponding to the downlink data.

Step S45, the terminal device sends the NACK and the second CQI to the network side device.

Step S46, the network side device adjusts an MCS based on the NACK and the CQI.

Step S47, the terminal device determines that the response message is an ACK.

Step S48, the terminal device obtains a third CQI of the downlink channel corresponding to the downlink data.

Step S49, the terminal device sends the ACK and the third CQI to the network side device.

Step S410, the network side device performs modulation and coding on the downlink data based on the ACK and the third CQI.

It should be noted that for processes of determining the second CQI and the third CQI, sending the NACK and the second CQI, and sending the ACK and the third CQI, refer to the foregoing descriptions. For the sake of brevity, details are not described herein again.

In an example, the CQI occupies one indicator bit. For example, 0 may be used to represent no offset, and 1 may be used to represent that an offset of the MCS is one unit. In addition, the ACK/NACK also occupies one indicator bit. The ACK is used to indicate improving a level of the MCS, and the NACK is used to indicate reducing the level of the MCS.

For example, 0 of the CQI represents no offset, and 1 of the CQI represents adjusting the MCS by one level. The ACK indicates improving the level of the MCS, and the NACK indicates reducing a level of the NACK. Details are shown in Table 1.

TABLE 1

| CQI | 0 (NACK) | 1 (ACK) |
|---|---|---|
| 0 | No offset | No offset |
| 1 | Reducing the MCS by one level | Improving the MCS by one level |

For another example, 0 of the CQI represents no offset, and 1 of the CQI represents adjusting the MCS by two levels. The ACK indicates improving the level of the MCS, and the NACK indicates reducing a level of the NACK. Details are shown in Table 2.

TABLE 2

| CQI | 0 (NACK) | 1 (ACK) |
|---|---|---|
| 0 | No offset | No offset |
| 1 | Reducing the MCS by two levels | Improving the MCS by two levels |

In this application, a reporting mode of the CQI and the ACK/NACK may be instructed by using higher-layer signaling. After receiving a reporting mode configuration instruction, the terminal device determines a mode to report the CQI and the ACK/NACK.

According to the manner in the embodiment, transmission reliability may be ensured, and scheduling with an excessively or undesirably low transmission effect may be avoided. In addition, a problem of a sharp increase of overheads caused by CQI feedback enhancement may also be avoided.

In another feasible implementation, the channel quality indicator feedback method provided may be as follows: a terminal device determines a response message of downlink data and a channel state, where the response message may be an ACK or a NACK, and the channel state may be a signal-to-noise ratio, or the like, of a current channel. Here, a channel state corresponding to the ACK response message may be a second channel state, and a channel state corresponding to the NACK response message may be a first channel state. However, in this embodiment, first channel state information may be determined based on the ACK/NACK and the channel state, and the first channel state information may indicate an offset of adjusting a level of an MCS. For example, the first channel state information may be 0, representing that there is no offset for the MCS, or the first channel state information may be 1, representing that the offset of the MCS is one level. For detailed descriptions of the ACK, the NACK, and the channel state information, refer to the foregoing descriptions. Details are not described herein again for the sake of brevity. A network side device may determine a channel state based on the foregoing response messages and the first channel state information.

Figure 5A:
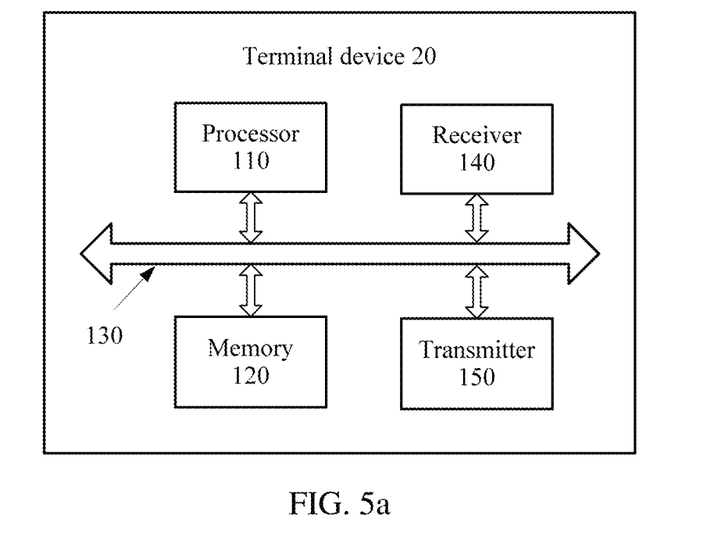
FIG. 5a is a schematic structural diagram of a terminal device.

According to the foregoing method, as shown in FIG. 5a, embodiments further provide a channel quality indicator feedback apparatus. The apparatus may be a terminal device 20, and the terminal device may correspond to the terminal device in the foregoing method.

The apparatus may include a processor 110 and a memory 120. Further, the apparatus may include a receiver 140 and a transmitter 150. Further, the apparatus may include a bus system 130. The processor 110, the memory 120, the receiver 140, and the transmitter 150 may be connected through the bus system 130.

The memory 120 is configured to store an instruction. The processor 110 is configured to execute the instruction stored in the memory 120 so as to control the receiver 140 to receive a signal and control the transmitter 150 to send a signal, so that the steps performed by the terminal device in the foregoing method are implemented. The receiver 140 and the transmitter 150 may be same physical entities or different physical entities. When the receiver 140 and the transmitter 150 are same physical entities, the receiver 140 and the transmitter 150 may be collectively referred to as a transceiver. The memory 120 may be integrated into the processor 110, or may be separated from the processor 110.

In an implementation, functions of the receiver 140 and the transmitter 150 may be implemented by using a transceiver circuit or a dedicated transceiver chip. The processor

110 may be implemented by using a dedicated processing chip, a processing circuit, a processor, or a universal chip.

In another implementation, the terminal device provided in this embodiment may be implemented by using a general-purpose computer. For example, program code that is used to implement functions of the processor 110, the receiver 140, and the transmitter 150 is stored in the memory. A general-purpose processor implements the functions of the processor 110, the receiver 140, and the transmitter 150 by executing the code in the memory.

For concepts, explanations, detailed descriptions, and other steps that are related to the apparatus and the technical solutions provided in the embodiments, refer to the descriptions about the content in the foregoing methods or in another embodiment. Details are not described herein again for the sake of brevity.

Figure 5B:
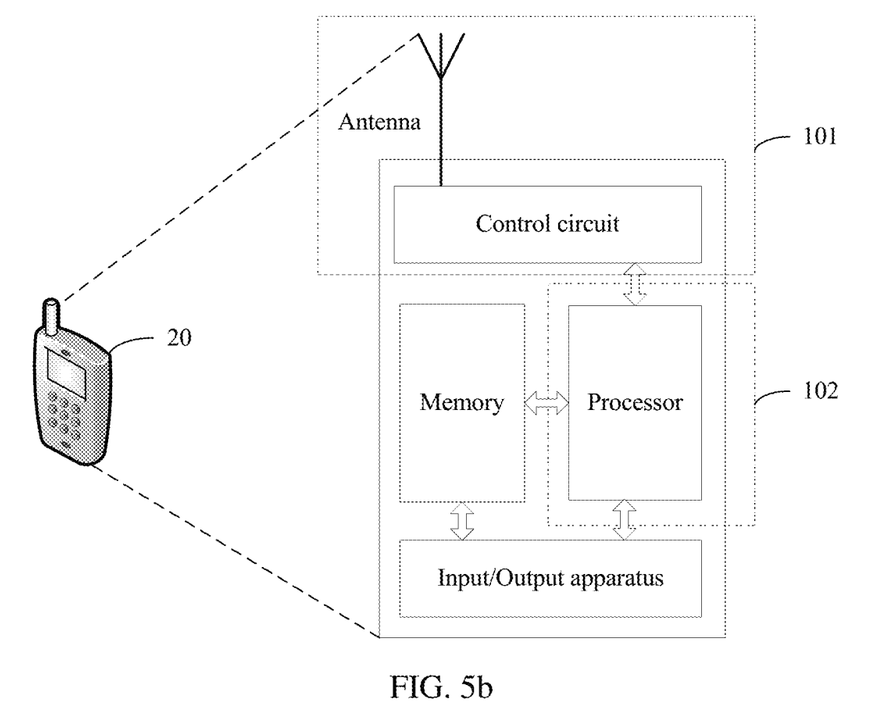
FIG. 5b is another schematic structural diagram of a terminal device.

FIG. 5b is a schematic structural diagram of a terminal device, namely, user equipment. The user equipment is applicable to the scenario shown in FIG. 1. For ease of description, FIG. 5b only shows main components of the terminal device. As shown in FIG. 5b, the terminal device 20 includes a processor, a memory, a control circuit, an antenna, and an input/output apparatus. The processor is configured to process a communication protocol and communication data, control the entire user equipment, execute a software program, and process data of the software program. For example, the processor is configured to support the terminal device in performing the actions described in FIG. 2. The memory is mainly configured to store a software program and data, for example, store a codebook described in the foregoing embodiment. The control circuit is configured to: convert a baseband signal and a radio frequency signal, and process a radio frequency signal. The control circuit and the antenna may be collectively referred to as a transceiver that is mainly configured to receive and send a radio frequency signal in an electromagnetic wave form. The input/output apparatus, such as a touchscreen, a display screen, or a keyboard, is configured to: receive data input by a user, and output data to the user.

After the user equipment is powered on, the processor may read a software program in the memory, explain and execute an instruction of the software program, and process data of the software program. When data needs to be sent wirelessly, after performing baseband processing on to-be-sent data, the processor outputs a baseband signal to a radio frequency circuit. After performing radio frequency processing on the baseband signal, the radio frequency circuit sends a radio frequency signal in an electromagnetic wave form through the antenna. When data is sent to the user equipment, the radio frequency circuit receives a radio frequency signal through the antenna, converts the radio frequency signal into a baseband signal, and outputs the baseband signal to the processor. The processor converts the baseband signal into data and processes the data.

A person of ordinary skill in the art may understand that for ease of description, FIG. 5b only shows one memory and one processor. Actual user equipment may include a number of processors and memories. The memory may also be referred to as a storage medium, a storage device, or the like, as desired. This is not limited in the embodiments described herein.

In an optional implementation, the processor may include a baseband processor and a central processing unit. The baseband processor is configured to process a communication protocol and communication data. The central processing unit is configured to: control the entire user equipment, execute a software program, and process data of the software program. The processor in FIG. 5b integrates functions of the baseband processor and the central processing unit. A person or ordinary skill in the art may understand that the baseband processor and the central processing unit may be alternatively processors independent of each other, and are interconnected by using a technology such as a bus. A person of ordinary skill in the art may understand that the user equipment may include a number of baseband processors to adapt to different network standards, and the user equipment may include a number of central processing units to enhance a processing capability of the user equipment. The components of the user equipment may be connected through various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in the storage unit in a software program form. The processor executes the software program to implement a baseband processing function.

For example, in an embodiment, the antenna and the control circuit that have receiving and sending functions may be considered as a transceiver unit 101 of the terminal device 20, and the processor with a processing function is considered as a processing unit 102 of the terminal device 20. As shown in FIG. 5b, the terminal device 20 includes the transceiver unit 101 and the processing unit 102. The transceiver unit may also be referred to as a transceiver, a transceiver apparatus, or the like, as desired. Optionally, in the transceiver unit 101, a component that is configured to implement a receiving function is considered as a receiving unit, and a component that is configured to implement a sending function is considered as a sending unit. In other words, the transceiver unit 101 includes the receiving unit and the sending unit. For example, the receiving unit may also be referred to as a receiver, a receiver circuit, or the like, as desired, and the sending unit may also be referred to as a transmitter, a transmitter circuit, or the like, as desired.

Figure 6A:
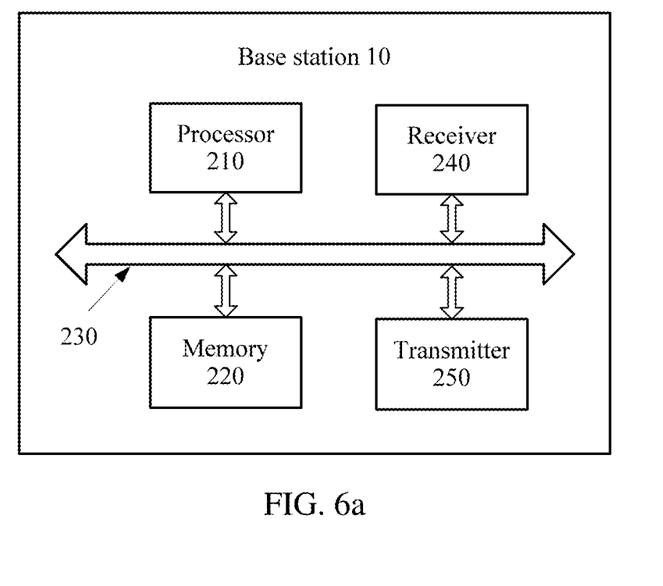
FIG. 6a is a schematic structural diagram of a base station.

According to the foregoing method, as shown in FIG. 6a, an embodiment further provides another channel quality indicator feedback device. The apparatus may be a base station 10, and the base station 10 corresponds to the network side device in the foregoing method.

The apparatus may include a processor 210 and a memory 220. Further, the apparatus may include a receiver 240 and a transmitter 250. Still further, the apparatus may include a bus system 230.

The processor 210, the memory 220, the receiver 240, and the transmitter 250 are connected through the bus system 230. The memory 220 is configured to store an instruction. The processor 210 is configured to execute the instruction stored in the memory 220 so as to control the receiver 240 to receive a signal and control the transmitter 250 to send a signal, so that the steps performed by the network device in the foregoing method are implemented. The receiver 240 and the transmitter 250 may be same physical entities or different physical entities. When the receiver 240 and the transmitter 250 are same physical entities, the receiver 240 and the transmitter 250 may be collectively referred to as a transceiver. The memory 220 may be integrated into the processor 210, or may be separated from the processor 210.

In an implementation, functions of the receiver 240 and the transmitter 250 may be implemented by using a transceiver circuit or a dedicated transceiver chip. The processor 210 may be implemented by using a dedicated processing chip, a processing circuit, a processor, or a universal chip.

In another implementation, the network side device provided in this embodiment may be implemented by using a general-purpose computer. For example, program code that is used to implement functions of the processor 210, the receiver 240, and the transmitter 250 is stored in the memory. A general-purpose processor implements the functions of the processor 210, the receiver 240, and the transmitter 250 by executing the code in the memory.

For concepts, explanations, detailed descriptions, and other steps that are related to the apparatus and the technical solutions provided in the embodiments of the present invention, refer to the descriptions about the content in the foregoing methods or in another embodiment. Details are not described herein again for the sake of brevity.

Figure 6B:
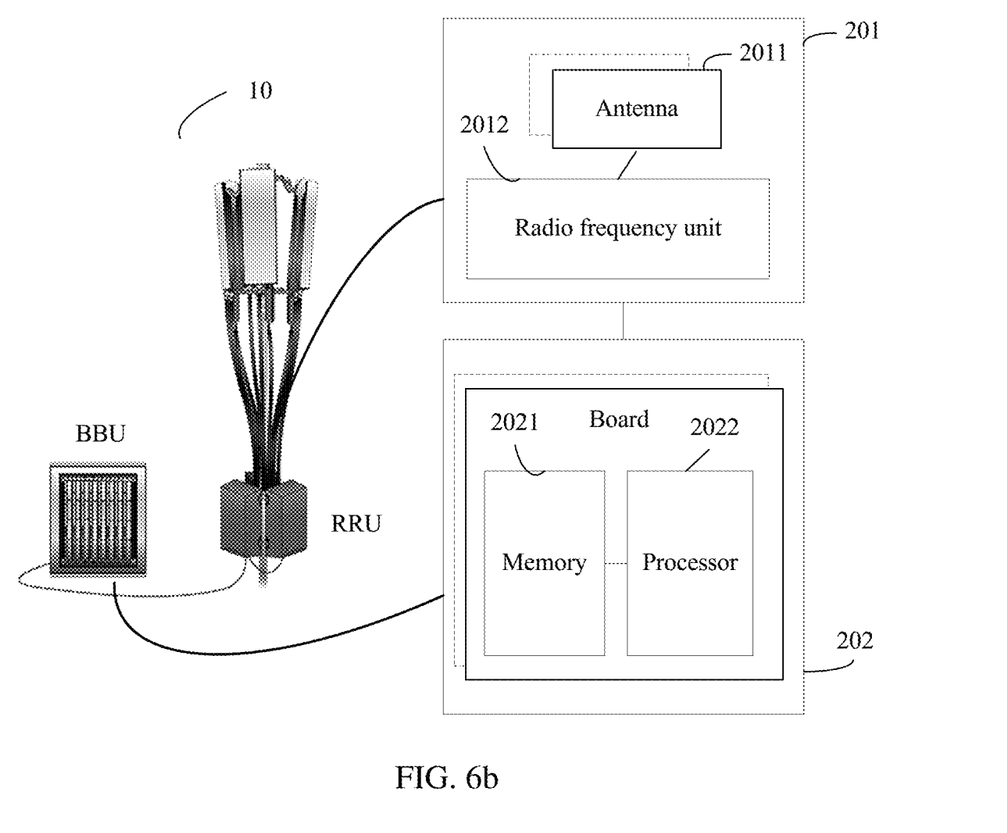
FIG. 6b is another schematic structural diagram of a base station.

According to the foregoing method, as shown in FIG. 6b, an embodiment further provides a schematic structural diagram of a wireless network device, such as a base station.

The base station may be applied to the scenario shown in FIG. 1. The base station 10 includes one or more radio frequency units, such as a remote radio unit (RRU) 201 and one or more baseband units (BBU) (which may also be referred to as digital units (DU)) 202. The RRU 201 may be referred to as a transceiver unit, a transceiver, a transceiver circuit, or the like, as desired, and may include at least one antenna 2011 and a radio frequency unit 2012. The RRU 201 is configured to: receive and send a radio frequency signal, and convert a radio frequency signal and a baseband signal, for example, configured to send a signaling indication and/or a reference signal in the foregoing embodiment to user equipment. The BBU 202 is configured to: perform baseband processing, control the base station, and the like. The RRU 201 and the BBU 202 may be physically disposed together, or may be physically separated, for example, in a distributed base station.

The BBU 202 is a control center of the base station, may also be referred to as a processing unit, and is configured to complete a baseband processing function such as channel coding, multiplexing, modulation, or spectrum spreading. For example, the BBU (baseband unit) may be configured to control the base station to execute the procedure shown in FIG. 3.

For example, the BBU 202 may include one or more boards, and a number of boards may jointly support a radio access network (such as an LTE network) of a single access standard, or may separately support radio access networks of different access standards. The BBU 202 further includes a memory 2021 and a processor 2022. The memory 2021 is configured to store a necessary instruction and necessary data. For example, the memory 2021 stores a correspondence between transmission delay difference information and a transmission delay difference in the foregoing embodiment. The processor 2022 is configured to control the base station to perform necessary actions, for example, configured to control the base station to perform actions shown in FIG. 3. The memory 2021 and the processor 2022 may serve one or more boards. In other words, a memory and a processor may be separately disposed on each board. Alternatively, a plurality of boards may share a same memory and a same processor. In addition, a necessary circuit may be further disposed on each board.

According to the methods provided in the embodiments, an embodiment further provides a communications system, and the communications system includes the foregoing network device and one or more elements of user equipment.

It should be understood that in the embodiments of the present invention, the processor may be a central processing unit (CPU), or the processor may be another general-purpose processor, a digital signal processor (DSP), an application-specific integrated circuit (ASIC), a field programmable gate array (FPGA), another programmable logic device, a discrete gate or transistor logic device, a discrete hardware component, or the like, as desired. The general-purpose processor may be a microprocessor, or the processor may be any conventional processor or the like, as desired.

The memory may include a read-only memory and a random access memory, and provide an instruction and data for the processor. A part of the memory may further include a non-volatile random access memory.

In addition to a data bus, the bus system may further include a power bus, a control bus, a status signal bus, and the like. However, for clear description, various types of buses in the figure are marked as a bus system.

In an implementation process, steps in the foregoing method can be implemented by using a hardware integrated logical circuit in the processor, or by using an instruction in a software form. The steps of the method disclosed with reference to the embodiments may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, and a register. The storage medium is located in the memory, and the processor reads information in the memory and completes the steps in the foregoing methods in combination with hardware of the processor. To avoid repetition, details are not described herein again.

It should be further understood that "first", "second", "third", "fourth", and various numerals in this specification are for distinguishing merely for ease of description, and are not used to limit the scope of the embodiments.

It should be understood that the term "and/or" in this specification describes only an association relationship for describing associated objects and represents that three relationships may exist. For example, "A and/or B" may represent the following three cases: Only A exists, both A and B exist, and only B exists. In addition, the character "/" in this specification usually indicates an "or" relationship between the associated objects.

It should be understood that sequence numbers of the foregoing processes do not mean execution sequences in the embodiments. The execution sequences of the processes should be determined based on functions and internal logic of the processes, and should not be construed as any limitation on the implementation processes of the embodiments of the present invention.

A person of ordinary skill in the art may be aware that, in combination with illustrative logical blocks and steps described in the embodiments disclosed may be implemented by electronic hardware or a combination of computer software and electronic hardware. Whether the functions are performed by hardware or software depends on particular applications and design constraints of the technical solutions. A person of ordinary skill in the art may use different methods to implement the described functions for each particular application, but it should not be considered that the implementation goes beyond the scope of the present invention.

It may be clearly understood by a person of ordinary skill in the art that, for the purpose of convenient and brief description, for a detailed working process of the foregoing system, apparatus, and unit, refer to a corresponding process in the foregoing method embodiments. Details are not described herein again to avoid repetition.

In the embodiments provided herein, it should be understood that the system, apparatus, and method may be implemented in another manner. For example, the described apparatus embodiment is merely an example. For example, the unit division is merely logical function division and may be other division in actual implementation. For example, a number of units or components may be combined or integrated into another system, or some features may be ignored or not performed. In addition, the displayed or discussed mutual couplings, direct couplings, or communication connections may be implemented through some interfaces. The indirect couplings or communication connections between the apparatuses or units may be implemented in an electronic form, a mechanical form, or another form.

The units described as separate parts may or may not be physically separate, and parts displayed as units may or may not be physical units, may be located in one position, or may be distributed on a number of network units. Some or all of the units may be selected based on actual requirements to achieve the objectives of the solutions of the embodiments.

In addition, functional units in the embodiments may be integrated into one processing unit, each of the units may exist alone physically, or two or more units are integrated into one unit.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to the embodiments are all or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, and a digital subscriber line (DSL)) or wireless (for example, infrared, radio, and microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like, as desired.

The foregoing descriptions are merely implementations, and are not intended to limit the protection scope of the present invention. Any variation or replacement readily figured out by a person of ordinary skill in the art within the technical scope disclosed herein shall fall within the protection scope of the present invention.

What is claimed is:

1. A channel quality indicator feedback method, comprising:
    determining, by a terminal device, a response message of data and a channel state, wherein the response message comprises at least one of an acknowledgement message or a negative acknowledgement message;
    determining, by the terminal device, first channel state information based on the response message of the data and the channel state; and
    sending, by the terminal device, the response message and the first channel state information to a network side device.

2. The method according to claim 1, wherein the response message comprises only the negative acknowledgement message;
    the determining, by a terminal device, of the response message of data and a channel state comprises:
    determining, by the terminal device when the response message of the data is the negative acknowledgement message, a first channel state of a channel corresponding to the data; and
    the determining, by the terminal device, of first channel state information based on the response message of the data and the channel state comprises:
    determining, by the terminal device, the first channel state information based on the negative acknowledgement message of the data and the first channel state.

3. The method according to claim 1, wherein the response message comprises the acknowledgement message and the negative acknowledgement message;
    the determining, by a terminal device, a response message of data and a channel state comprises:
    determining, by the terminal device when the response message of the data is the negative acknowledgement message, a second channel state of a channel corresponding to the data; and
    determining, by the terminal device when the response message of the data is the acknowledgement message, a third channel state of the channel corresponding to the data; and
    the determining, by the terminal device, of first channel state information based on the response message of the data and the channel state comprises:
    determining, by the terminal device, the first channel state information based on the negative acknowledgement message and the second channel state; or determining, by the terminal device, the first channel state information based on the acknowledgement message and the third channel state.

4. The method according to claim 1, wherein the response message indicates a direction for adjusting a modulation and coding scheme, and the direction for adjusting the modulation and coding scheme is improving a level of the modulation and coding scheme or reducing the level of the modulation and coding scheme; and the first channel state information indicates an offset of adjusting the level of the modulation and coding scheme, and the modulation and coding scheme is used to perform modulation and coding on the data.

5. The method according to claim 4, wherein the acknowledgement message indicates that the direction for adjusting the modulation and coding scheme by the network side device is improving the level of the modulation and coding scheme, and the negative acknowledgement message indicates that the direction for adjusting the modulation and coding scheme by the network side device is reducing the level of the modulation and coding scheme.

6. The method according to claim 1, wherein the sending, by the terminal device, of the response message and the first channel state information to the network side device comprises:

receiving, by the terminal device, a downlink scheduling instruction sent by the network side device, wherein the downlink scheduling instruction is used to indicate a timing relationship among the data, the response message, and the first channel state information; and sending, by the terminal device, the response message and the first channel state information to the network side device based on the timing relationship.

7. The method according to claim 1, wherein channel coding is separately performed on the response message and the first channel state information.

8. The method according to claim 7, wherein the response message is encoded in a first coding scheme, and the first channel state information is encoded in a second coding scheme.

9. A channel quality indicator feedback method, comprising:

receiving, by a network side device, a response message and first channel state information sent by a terminal device, wherein the response message comprises at least one of an acknowledgement message or a negative acknowledgement message, and wherein the response message and first channel state information sent by the terminal device includes at least one of a direction for adjusting a modulation and coding scheme and an offset of adjusting the level of the modulation and coding scheme; and determining, by the network side device, a channel state based on the response message and the first channel state information.

10. The method according to claim 9, wherein the response message is the negative acknowledgement message;

the receiving, by a network side device, of the response message and first channel state information that are sent by a terminal device comprises:

receiving, by the network side device, the negative acknowledgement message and the first channel state information that are sent by the terminal device, wherein the negative acknowledgement message is a response message of the terminal device to data sent by the network side device, and the first channel state information is generated by the terminal device based on the negative acknowledgement message and a first channel state; and the determining, by the network side device, of the channel state based on the response message and the first channel state information comprises:

determining, by the network side device, the channel state based on the negative acknowledgement message and the first channel state information.

11. The method according to claim 9, wherein the response message comprises the acknowledgement message and the negative acknowledgement message;

the receiving, by a network side device, of the response message and first channel state information that are sent by a terminal device comprises:

receiving, by the network side device, the negative acknowledgement message and the first channel state information that are sent by the terminal device, wherein the negative acknowledgement message is a response message of the terminal device to data sent by the network side device, and the first channel state information is generated by the terminal device based on the negative acknowledgement message and a second channel state; or receiving, by the network side device, the acknowledgement message and the first channel state information that are sent by the terminal device, wherein the acknowledgement message is a response message of the terminal device to data sent by the network side device, and the first channel state information is generated by the terminal device based on the negative acknowledgement message and a third channel state; and the determining, by the network side device, of the channel state based on the response message and the first channel state information comprises:

determining, by the network side device, the channel state based on the negative acknowledgement message and the first channel state information; or determining, by the network side device, the channel state based on the acknowledgement message and the first channel state information.

12. The method according to claim 9, wherein the response message indicates the direction for adjusting the modulation and coding scheme, and the direction for adjusting the modulation and coding scheme is improving a level of the modulation and coding scheme or reducing the level of the modulation and coding scheme; and the first channel state information indicates the offset of adjusting the level of the modulation and coding scheme.

13. The method according to claim 12, wherein the acknowledgement message indicates that the direction for adjusting the modulation and coding scheme by the network side device is improving the level of the modulation and coding scheme, and the negative acknowledgement message indicates that the direction for adjusting the modulation and coding scheme by the network side device is reducing the level of the modulation and coding scheme.

14. The method according to claim 9, wherein the receiving, by a network side device, of the response message and first channel state information that are sent by a terminal device comprises:

sending, by the network side device, a downlink scheduling instruction, wherein the downlink scheduling instruction is used to indicate a timing relationship among the data, the response message, and the first channel state information; and receiving, by the network side device based on the timing relationship, the response message and the first channel state information that are sent by the terminal device.

15. The method according to claim 9, wherein channel coding is separately performed on the response message and the first channel state information.

16. A channel quality indicator feedback device, comprising a processor and a memory, wherein the memory is configured to store an instruction; and the processor is configured to execute the instruction stored in the memory, and when the processor executes the instruction stored in the memory, the processor is configured to: determine a response message of data and a channel state, wherein the response message comprises at least one of an acknowledgement message or a negative acknowledgement message; determine first channel state information based on the response message of the data and the channel state; and send the response message and the first channel state information to the network side device. .

17. The device according to claim 16, wherein the response message comprises only the negative acknowledgement message;

when determining the response message of the data and the channel state, the processor is configured to: when the response message of the data is the negative acknowledgement message, determine a first channel state of a channel corresponding to the data; and when determining the first channel state information based on the response message of the data and the channel state, the processor is configured to:

determine the first channel state information based on the negative acknowledgement message of the data and the first channel state.

18. The device according to claim 16, wherein the response message comprises the acknowledgement message and the negative acknowledgement message;

when determining the response message of the data and the channel state, the processor is configured to:

when the response message of the data is the negative acknowledgement message, determine a second channel state of a channel corresponding to the data; and when the response message of the data is the acknowledgement message, determine a third channel state of the channel corresponding to the data; and when determining the first channel state information based on the response message of the data and the channel state, the processor is configured to:

determine the first channel state information based on the negative acknowledgement message and the second channel state; or determine the first channel state information based on the acknowledgement message and the third channel state.

19. The device according to claim 16, wherein the response message indicates a direction for adjusting a modulation and coding scheme, and the direction for adjusting the modulation and coding scheme is improving a level of the modulation and coding scheme or reducing the level of the modulation and coding scheme; and the first channel state information indicates an offset of adjusting the level of the modulation and coding scheme, and the modulation and coding scheme is used to perform modulation and coding on the data.

20. The device according to claim 19, wherein the acknowledgement message indicates that the direction for adjusting the modulation and coding scheme by the network side device is improving the level of the modulation and coding scheme, and the negative acknowledgement message indicates that the direction for adjusting the modulation and coding scheme by the network side device is reducing the level of the modulation and coding scheme.

* * * * *

UNITED STATES PATENT AND TRADEMARK OFFICE
CERTIFICATE OF CORRECTION

PATENT NO. : 11,018,802 B2
APPLICATION NO. : 16/575530
DATED : May 25, 2021
INVENTOR(S) : Yongxia Lyu Page 1 of 1

It is certified that error appears in the above-identified patent and that said Letters Patent is hereby corrected as shown below:

In the Claims

Column 2, Claim 16, Line 64, replace "information to the network side device. ." with "information to the network side device."

Signed and Sealed this
Fifth Day of October, 2021

Drew Hirshfeld
*Performing the Functions and Duties of the*
*Under Secretary of Commerce for Intellectual Property and*
*Director of the United States Patent and Trademark Office*